DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 10

T927,012
PROCESS FOR EXPANDING PNEUMACEL FIBER BATTS

John Raymond Ferrara, 201 Sykes Road, New Castle, Del. 19720

Filed Dec. 27, 1973, Ser. No. 428,920
Int. Cl. B29d *27/00*
U.S. Cl. 264—321
No Drawing. 5 Pages Specification

An improvement over the process of molding compressed, resin-bonded nonwoven batts of pneumacel fiber by thermal expansion in a mold and cooling before removal therefrom includes the following steps: (1) thermal expansion of the batt to a thickness about as great or greater than that of the molded form desired, (2) cooling to set the batt in the expanded form, (3) compression of the expanded batt into the mold, (4) heat treatment to deactivate the interfiber bonds and (5) cooling sufficiently to reestablish the bonds in the new fiber configuration before removal of the batt from the mold.